United States Patent
Adachi

[19]

[11] Patent Number: 6,111,601
[45] Date of Patent: Aug. 29, 2000

[54] NON-CONTACTING LASER GAUGE FOR QUALIFYING SCREW FASTENERS AND THE LIKE

[76] Inventor: Yoshi Adachi, 16214 Watson Cir., Westminster, Calif. 92683

[21] Appl. No.: 08/570,091

[22] Filed: Dec. 11, 1995

[51] Int. Cl.$^7$ ...................................................... H04N 7/18
[52] U.S. Cl. ............................. 348/92; 348/86; 348/128; 348/131; 348/137
[58] Field of Search ................................. 348/86, 92, 125, 348/131; 382/141; 356/376, 380, 387; H04N 7/18

[56] References Cited

U.S. PATENT DOCUMENTS

| | | | |
|---|---|---|---|
| 3,941,484 | 3/1976 | Dreyfus | 356/388 |
| 4,576,482 | 3/1986 | Pryor | 356/376 |
| 4,644,394 | 2/1987 | Reeves | 348/131 |
| 4,777,360 | 10/1988 | Carner | 348/64 |
| 4,823,396 | 4/1989 | Thompson | 348/91 |
| 4,828,159 | 5/1989 | Woods | 227/156 |
| 5,114,230 | 5/1992 | Pryor | 356/372 |
| 5,150,623 | 9/1992 | Woods | 73/865.8 |
| 5,327,217 | 7/1994 | Kanai | 356/353 |

Primary Examiner—Howard W. Britton
Attorney, Agent, or Firm—James T. English

[57] ABSTRACT

A non-contact gaging method and apparatus using a directional light beam develops a silhouette image on a CCD camera detector array; the image spanning opposite edges of an object to be gauged. The three dimensional object is imaged on the two dimensional camera array and, by means of computer analysis of pixels output from the camera, precise measurements to MIL Standards of physical dimensions are made at high rates for high volume production.

Errors inherent in Prior Art devices are eliminated by only using a point source of light and eliminating the need for any additional optics. The system overcomes dimensional error by continuously gauging the high precision etched mark on the camera faceplate.

Errors introduced by translating a three dimensional object's image into two dimensions are compensated in the computer software and, in essence, the two-dimensional image as captured by the camera is transformed via computer to a three-dimensional image that can be used to accurately gauge to determine parameters of a machined article such as a threaded fastener's pitch diameter, thread pitch, major and minor diameter, flank angle, and length of thread engagement.

10 Claims, 5 Drawing Sheets

NON-CONTACTING LASER GAUGE FOR QUALIFYING SCREW FASTENERS AND THE LIKE

BACKGROUND OF THE INVENTION

1. Field of the Invention

The invention has a two-fold purpose, i) a method and apparatus for rapidly and automatically measuring dimensions of fasteners by non-contact methods, and ii) an instrument which is compact, rugged and reliable enough to be used under a variety of adverse conditions.

The invention employs imaging to obtain a two dimensional pixel image silhouette subject to analysis whereby precise measurements are performed. The instrument's hardware is composed of minimal components to minimize sources of errors and is compact to be hand held and rugged enough to be used on a factory floor without any concern for instrument malfunction. The invention is a non-contact gaging method which automatically and rapidly gauges the dimensions of precision objects.

2. Prior Art

A higher quality product (fastener) leads to longer life of the end product where they are used. Most of the instruments available to the market are contact based and tend to be sluggish in their operation and require experience for its proper use on the part of the operator. The non-contact based instruments available to the industry are still not optimized for their speed and are quite expensive to be readily accessible to a wider market. On the other hand optical based instruments available to the industry at present do not lack speed but lack the tolerances as required by the industry. In numerous applications, particular dimensions of the fasteners are critical as to how precise, that is, how smoothly the fasteners engage mating fasteners. The author feels that there is a need for an instrument which possesses the following properties—high speed gaging, accuracy, minimal or no alignment requirements, and priced so that the instrument is readily affordable.

The following parameters need to be determined whereby the quality of fasteners can be assessed; functional pitch diameter, pitch diameter, minor and major diameter, drunken helix, shank diameter, perpendicularity, eccentricity, thread pitch, pitch diameter, flank angle, length of thread engagement. This instrument allows for the possibility of measurements to be accomplished as quickly as the parts are produced, whereby 100% quality assurance becomes a possibility and hence, a reality. Presently, tradeoffs are made between quality assurance measurement and speed, for example by taking measurements on a small percentage of the fasteners from the batch.

Prior art takes at least minutes to accurately gauge relevant fastener's dimensions. Because of this, it is not possible to timely gauge reasonable numbers of fasteners in a batch to determine if the batch falls within a specific tolerance or as a matter of fact, conduct a Statistical Process Control in a manner such that a bottleneck is not formed. It is not uncommon that only a very small percentage of the fasteners in the batch be gauged under the Statistical Process Control.

Under the Fastener Quality Act it will be required to sell fasteners with certification of qualified tests conducted on the batch of fasteners with the laboratory conducting such measurements certified by the National Standards Laboratory such as the NIST. The number of fasteners inspected under the SPC is as low as one hundredth of a percent. If the selected group of fasteners passes, the entire batch is accepted. What would be desirable is to provide the industry with a low cost high speed rugged instrument which would allow for higher sampling rate, further improving the standard of fasteners available in the marketplace thereby enhancing the quality of the end product. Even more desirable would be to provide a specific market a 100% measurements for all the fasteners provided. This industry can be such as NASA's space station or high performance aircraft, whose total cost to procure when compared with the cost to conduct 100% inspection is an insignificant fraction. A device comprising independent hardware component variables to conduct certain measurements of an object is susceptible to error by the very process of conducting such measurements. It is desirable to minimize the hardware components involved to conduct such measurements so as to reduce a chance of such problems or failure from occurring in the first place. A scanning arrangement is inherently serial, and as a result, the scanner can sense light intensity from the beam at only unit area at a given time. Timing and precise repetitive motion considerations affect the accuracy of the measurement. Moreover, scanning arrangements are prone to further error if one attempts to apply them to moving parts.

Most of the instruments available in the market employ a lens to expand the point source laser light to encompass an object to be examined, the object is backlighted by use of a light source. The object partly occludes the beam and provides an image. Lenses concentrate the beam at a point or scanning tube arrangement, such that the luminance level is sampled repetitively in conjunction with a threshlod comparator and timing means to locate the edge of the object from a change in the intensity of the luminance signal. The comparator data, in connection with timing data, can be converted into a dimensional measurement. U.S. Pat. No. 3,941,484—Dreyfus, describes the device which employs such method.

U.S. Pat. Nos. 4,576,482, and 5,114,230, both to Pryor, disclose methods in which a collimated laser light is used as a back-light to collect luminance information by finding the transition in luminance across a single edge of an object. The light is partly occluded by the object and is applied to a linear photodiode array having an extension perpendicular to the edge. The object is rotated along its axis to inspect across the diameter to determine major diameter, and to check the quality of fastener threads. Reflected light, because of the scattering from a surface, produces a low signal to noise ratio resulting in low accuracy measurements when used to gauge fastener dimensions. The accuracy of the measurements performed with such methods is limited by several factors, including the fidelity of the input image. Signals are analyzed by this technique, indirectely to extract the relevant information pertaining to the object's dimensions.

Over the last few years considerable improvement has been made in image enhancement technology whereby quality of the captured image is improved considerably. Aberrations, defocused images can be corrected for with the present day image software technology. Images can be improved by edge enhancements, deconvolution, sobels, gradient technique and others. What a software based enhancement is capable of conducting can be best described by the images of the distant galaxy as captured by the Hubble telescope. Remarkable improvement in the quality of the images are evident after the images are processed. So, to the author of the present patent application, to gauge a fastener or part utilizing the image enhancement technology in conjunction with the hardware offers a distinct advantage and a unique capability which is not available to the industry. This instrument, primarily because of afew components, offers a very rugged construction.

Thread gaging is a demanding imaging problem that has not been addressed properly and to our knowledge, not been solved. The three dimensional object's image is captured onto a two-dimensional array. When the image is gauged as is, the measurements do not represent true dimensions of the threaded fasteners.

The primary object of the invention is to calculate and determine from the two dimensional image a three dimensional gauge fastener's dimension and gauge the object's dimensions at high speed correctly and accurately. The helical angle on the threaded fasteners induces error onto the measurements of the pitch diameter of the fasteners and hence to its functional diameter. In this invention, we calculate from the captured image the helical angle and thereby calculate the error introduced on the pitch diameter and correctly estimate the pitch diameter. The invention avoids tilting the fastener to measure the correct pitch diameter. The invention contains no moving parts to accurately gauge fasteners. The errors introduced by capturing a three dimensional object's image onto a two dimensional array are corrected by the software means in this imvention. In essence a two dimensional image is transformed via software means to a three dimensional image in a computer memory and, with this information, accurate dimensions are displayed.

The invention not only eliminates a need for a focusing lens, but also does away with the spatial filter, and the like. Emphasis is placed on the software to gauge accurately as long as the conditions under which calibration is conducted is unaltered during the measurement period. Previously, it was necessary to accurately position the focusing lens in space a certain distance from the object being gauged, in order to produce a focused image/shadow. In the invention, minimizing the distance between the object, and the location of the array is important to gauge. This technique is without a need for a lens and spatial filter, and the accompanying problem of correctly positioning the lens with respect to the object and otherwise focusing the image.

U.S. Pat. No. 4,644,394—to Reeves, discusses examining external threads, on pipe, and/or fasteners. The patent employs a collimated laser beam to back light the threads along one side of the work piece—in his example case, a pipe. A luminance transition is hence employed, and the incident radiation impinging on the work piece and partly transmitting on the work piece is thus detected at a tangent of the workpiece surface. The information obtained as such is an image of the pipe threads is not of only one side of the pipe but is also of only one particular angular point on one side of the pipe. Data as such is collected and processed and enables certain thread measurements in that particular area only. However, in order to make other related thread measurements at other angular points around the pipe, it is necessary to move the part of the instrument precisely to gauge properly while maintaining the alignment. These drive requirements introduce time constraints and measurement inaccuracies. As can be deduced by those familiar with the art of gaging, it is necessary to rely on the accuracy of the rotational drive means and the ability to accurately position the part at different angular positions around the rotation axis. This process not only reduces the time to gauge, but also increases the probability of error due to the moving parts associated during the gaging process.

In the following two paragraphs we discuss the patents issued to the Boeing Air Corporation. U.S. Pat. No. 4,823, 396 granted to Thompson discloses a method in which a fastener's dimensions are measured by the imaging technique. The workpiece in this case is a rivet back-lit by an array of light emitting diodes. A video image of the fastener is created which is digitized and processed and analyzed. Various dimensional measurements including the head and shank of the fasteners are conducted. The accuracy of the measurements performed is dependent on the distance between the camera lens and the fasteners. Slight variations in focus and the distance translate to variations in the apparent size of features in the image on the camera detector array, and consequently measurement errors. Such uncertainties are significant when fasteners must be measured to within tight tolerances, for example, for use in the aerospace industry.

The other two patents assigned to the Boeing Air Corporation and issued to Woods, that is U.S. Pat. Nos. 4,828,159 and 5,150,623 disclose imaging methods to gauge fastener dimensions. The first patent discloses methods which use two cameras, imaging the fastener from two orthogonal directions and mathematically calculating the position of the fastener by means of the focussing distances. Hence determination of precise fastener position is dependent upon precise camera focussing. An out of focus image leads to an error in calculation of the fastener's position and translates into error in measuring the fastener's dimensions. It is desirable to have an instrument which does not have the above mentioned drawbacks.

Furthermore the ideal circumstance, where this technology is available on every engineer's desk is if the instrument can be constructed in a manner that is not only rugged but is also compact enough to be conveniently transported without the problems of misalignment. Such problems are compounded if the spatial filter is involved to remove the random noises and collimating optics for the beam. The technology has progressed rapidly; stabilizing the source's noise such that accurate measurements can be performed without any intervening optics or optical components is available to the industry, but is cost prohibitive to be a part of the end product. Whenever optical noises are present, fluctuations due to the source offer minimal or no reduction in the accuracy required for gaging a fastener, rivets or the like, as required by the stringent MIL Standards. This is the strength of the present patent and emphasizes this point as one of the primary motivations behind the invention.

The basic idea behind the present invention disclosed in this patent is that the instrument collects and analyzes a two dimensional image of an object by employing digital imaging means and conducts dimensional measurements. An image of an object and hence its profile, is captured on a two dimensional detector array. The image is digitized by means of a frame grabber and analyzed by image enhancement techniques intended to produce better edge contrast. Even further precision is achieved by using subpixel algorithms. A hardware means such as a digital computer or digital signal processor processes the digital information to analyze the image to locate edges and other relevant image parameters. At all times, the high precision scale etched on the faceplate of the fiberoptic column is gauged for its dimensions and compared with the stored information. The stored information is obtained via standard contact based gaging methods, methods which are well accepted by industry. Any difference in the comparison is compensated for, which translates to beam divergence or convergence etc. This process eliminates the need for maintaining high stability and alignment of the optics at all times. The process in essence ruggedizes the instrument. Various dimensions of the objects are determined by this method from the pixel position displacements between transition positions and luminance. In light of the drive by the microprocessor industry for faster and cheaper processors, with a proper setup, measurements can be made quickly and accurately even of objects moving rapidly on an assembly line conveyor.

In the following paragraphs, we discuss the patents which appear to cover certain aspects of our invention. It should be pointed out that gaging is not the motivation of these prior art patents and hence they do not fall into the envelope of our claims. Nevertheless, these patents will be discussed here to point out distinct differences between our invention and these prior art patents.

U.S. Pat. No. 4,777,360 issued to Don C. Carner, Jr. titled "Umbra/Penumbra Detector" uses the camera detector array without the use of a focusing lens. The invention is a lensless direct-contact or "shadow-casting" imaging system which is used in conjunction with any image sensing substrate. The device monitors the characteristics of an image cast upon a radiation sensitive substrate. The image can be cast by the shadow or a mask and at least one source of radiation disposed above the object or mask so that the image can be cast on the substrate and analyzed. The patentee points out that the image provides the means by which two, three, and four dimensional data representations can be made of any environment where radiation is present. This is an ideal instrument for gaging as long as the object to be gauged is a two dimensional object. For example, if a fastener is gauged with this instrument, due to the three dimensional nature of the fastener, and in particular to its helical angle, if one takes it's two dimensional image and gauges using this image, it will calculate the dimensions incorrectly. We have determined that, for the fasteners manufactured within the tolerances, the errors associated with the pitch diameter by this method fall, incorrectly, well outside the actual dimensions and tolerance requirement as demanded by the industry. We compared the measurements as obtained by this instrument against the measurements as obtained by other established methods of gaging. This method was used to extensively test using different numbers and types of fasteners; and despite the fact for fasteners whose measurements fell within the tolerance requirement with other established methods, the measured values came out quite wrong with this technique. Extensive software need to be written to correct for these discrepancies. For these reasons, our patent differs significantly from the patents of the others. Not mentioned is: one needs to employ subpixel algorithms to gauge the fasteners to the accuracy as demanded by the industry. If one gauges without the use of the subpixel routine, the errors associated with these measurements exceeds by far the required accuracy for the measurements and hence the instrument is of no relevance to the industry.

The cost associated with larger size CCD/CID analysis is prohibitively expensive to employ other means for gauging. Fiber optic coupling is used to reduce the size of a fastener to be gauged, such that when the image is captured, the full diameter of the fastener image is captured. Moreover, the fiber optic coupler allows moving the optic axis of the camera's array significantly away from its original position for any practical use.

U.S. Pat. No. 5,327,217 issued to Kanai et.al. titled "Apparatus For Measuring Particulate Size Without Contacting the Particulate" uses the apparatus for measuring the size of a particulate, without contacting the particulate. Stripped gaps of interference fringes are measured behind the particulate when a monochromatic beam is radiated on the particulate. In this patent the particulate is placed at a distance from the detector array and the expression is derived to calculate its dimensions from its interference fringes. This is an innovative as well as clever scheme, but differs in its entirety from the present invention. Kanai et.al. enhances the particulate fringes and the present patent is attempting to minimize this effect. Moreover, the expression derived in their patent is not relevant for our purposes because the distance from the camera array to the object which is to be measured, is finite. In contrast, we keep the distance between the object (fastener) and the camera array to minimum and in this domain a mathematical expression is inapplicable. Moreover, if one uses the technique of Kanai et.al. for gaging fasteners the diffraction patterns interfere with the adjacent threads creating a very complicated mesh incapable of allowing the operator to generate ANY information from the silhouette.

BRIEF SUMMARY OF THE INVENTION

The invention employs an indirect method and apparatus for gauging the important dimensions of a plurality of fastener types for production reporting, quality assurance, selection/rejection decisions and the like such as Statistical Process Control (SPC). Dimensions are determined rapidly in an automated fashion and to a high accuracy by using customized software. A fastener or rivet whose dimensions are to be determined preferably is positioned by automated means, or manually, immediately in front of a two dimensional fiber optic coupler attached to the solid state CCD or CID type camera. The fastener can be positioned by any preferred means, for example, manually, conveyor bracket or tube, so that the fastener is positioned for measurement.

The primary object of the invention is to calculate and determine from the two dimensional image a three dimensional fastener's dimension and gauge the object's dimensions at relatively high speed correctly and accurately.

The helical angle on threaded fasteners induces error into the measurements of the pitch diameter of the fasteners when using captured image for gaging. This angle is provided for the particular fasteners prior to the gaging measurements. In this invention calculations are made from the captured image of the helical angle and thereby calculate the error introduced on the pitch diameter by the manufacturing process and correctly gauge the pitch diameter. The invention avoids tilting the fastener to measure the correct pitch diameter. The invention contains no moving parts to accurately gauge fasteners. The errors introduced by capturing a three dimensional object's image onto a two dimensional array are corrected by the software means in this invention. In essence a two dimensional image is transformed via software means to a three dimensional image in the computer memory and with this information accurate dimensions are displayed.

The invention not only eliminates the need for a focusing lens but also does away with the spatial filter. Emphasis is placed on the software to gauge accurately.

The prior art required that the focusing lens had to be placed a certain distance from the object being gauged in order to produce an image/shadow identical in size to the object. In the invention, minimizing the distance between the object to be gauged and the location of the array, is important to gauge accurately. The technique of the invention is without a need for a lens and spatial filter and the accompanying problems of correctly positioning the lens with respect to the object and maintaining focus on the image.

DETAILED DESCRIPTION OF THE PREFERRED EMBODIMENTS

Figure 1:
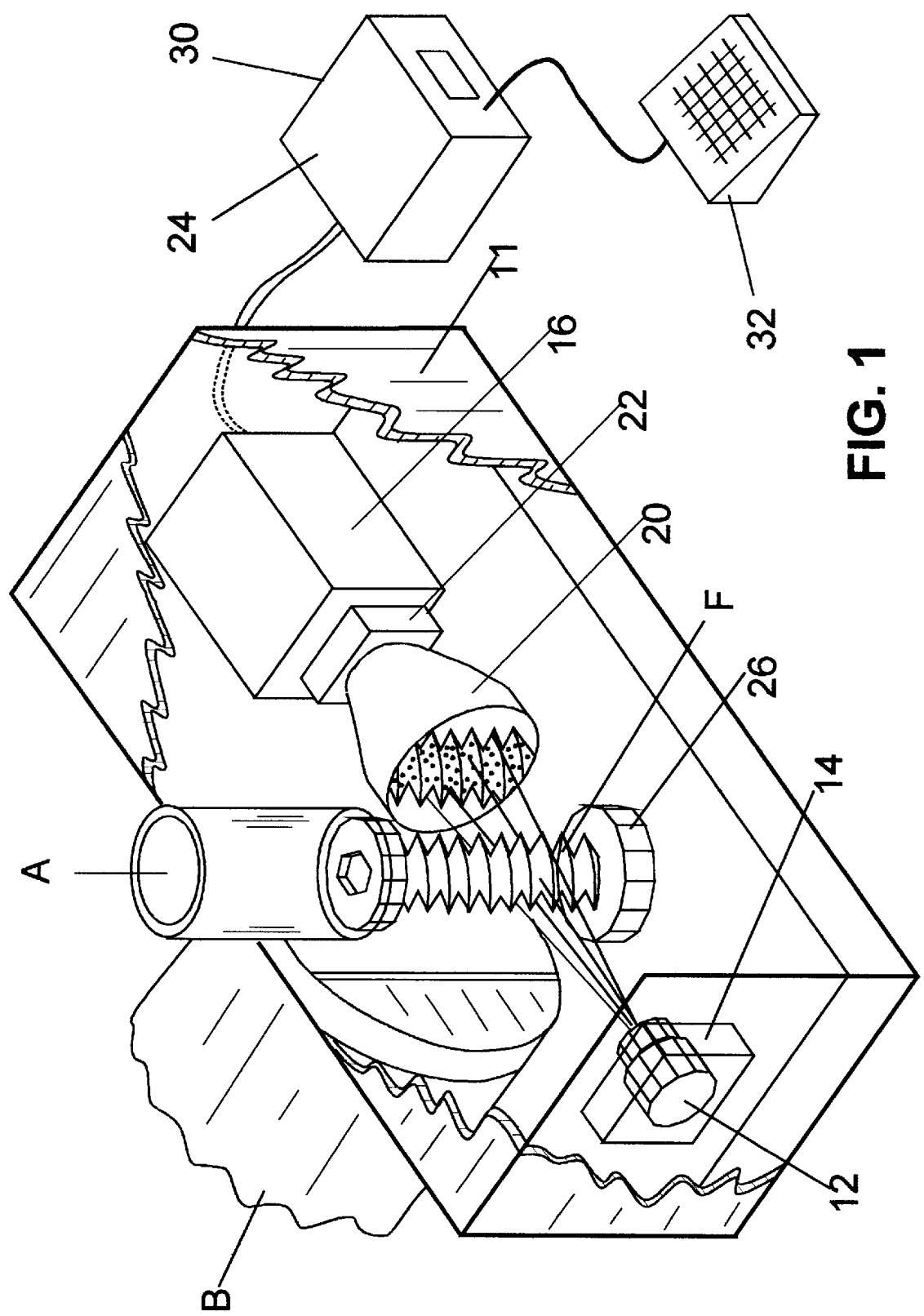
FIG. 1 is an isometric drawing of one possible embodiment of the laser gauge system in an industrial production environment including the novel gaging instrument and article feed to the test—and rotation site where required—where articles are tested and vacuumed to pass or reject sites.

Referring now to FIG. 1, the instrument is made up of a highly rigid housing 11 of a solid, preferably cast material such as aluminum, that helps prevent vibrations from the environment, such as might be encountered from the article transporting device mechanisms, from influencing the gaging system. The rigidity also assures that there is no misalignment once the instrument is calibrated and in use between light source 12 and the receiver 16. The light source 12 is mounted inside another housing 14 at one end of the housing 11 such that the beam axis of the light emerging from the light source housing 14 is aligned normal to the surface of the flat surface of the coherent fiber optic bundle 20 surface. The width of the light beam as emitted from the laser source 12 is larger than the size of the pupil of the video camera array 22. Accordingly, the rays from the light source 12 are aligned by the coherent fiber optic bundle 20 and receiver camera 16 to be parallel to one another and to the optical axis, over a height and width that is larger than the height and width of the article to be gauged, or that part of the article to be imaged and measured. A planar solid state video sensor array 22 is disposed behind the fastener F and due to the incident radiation, a silhouette of the article F is formed on the array 22. No lens is used in front of the sensor array 22 of the camera 16. The unidirected light beam and camera 16 are oriented such that the axis and center of each lie along a line defined by the light propagation axis from the source 12. The camera 16 or detector array 22 likewise is oriented normal to the propagation axis.

Articles are positioned in the path of the directional light beam, and the camera array 22. An image processor 30 and preferably a display monitor 32 are coupled to camera 16, such that the luminance information for each pixel in detector array 22 is provided to the image processor 30.

The image processor 30 can include means for addressing the pixel elements in the detector array 22, an analog to digital converter (not shown) and associated timing means. The image processor can be triggered to commence an image measurement cycle whenever an article arrives in the field of view, and to collect a series of images of the passing article, while being rotated by rotating system 26 when used.

The light source 12 outputs a directional beam 24 which propagates toward the camera 16 and impinges on the detector array 22 essentially at normal incidence.

The article F preferably is suspended from the positioning system with its axis within a few degrees of the vertical. The article F is positioned so that it lies entirely within the uncollimated beam, and therefore casts its full shadow or silhouette on the detector array 22. Article F occludes part of the uncollimated laser beam from source 12, thus producing a dimensionally precise silhouette of the article on the detector array 22.

Figure 2:
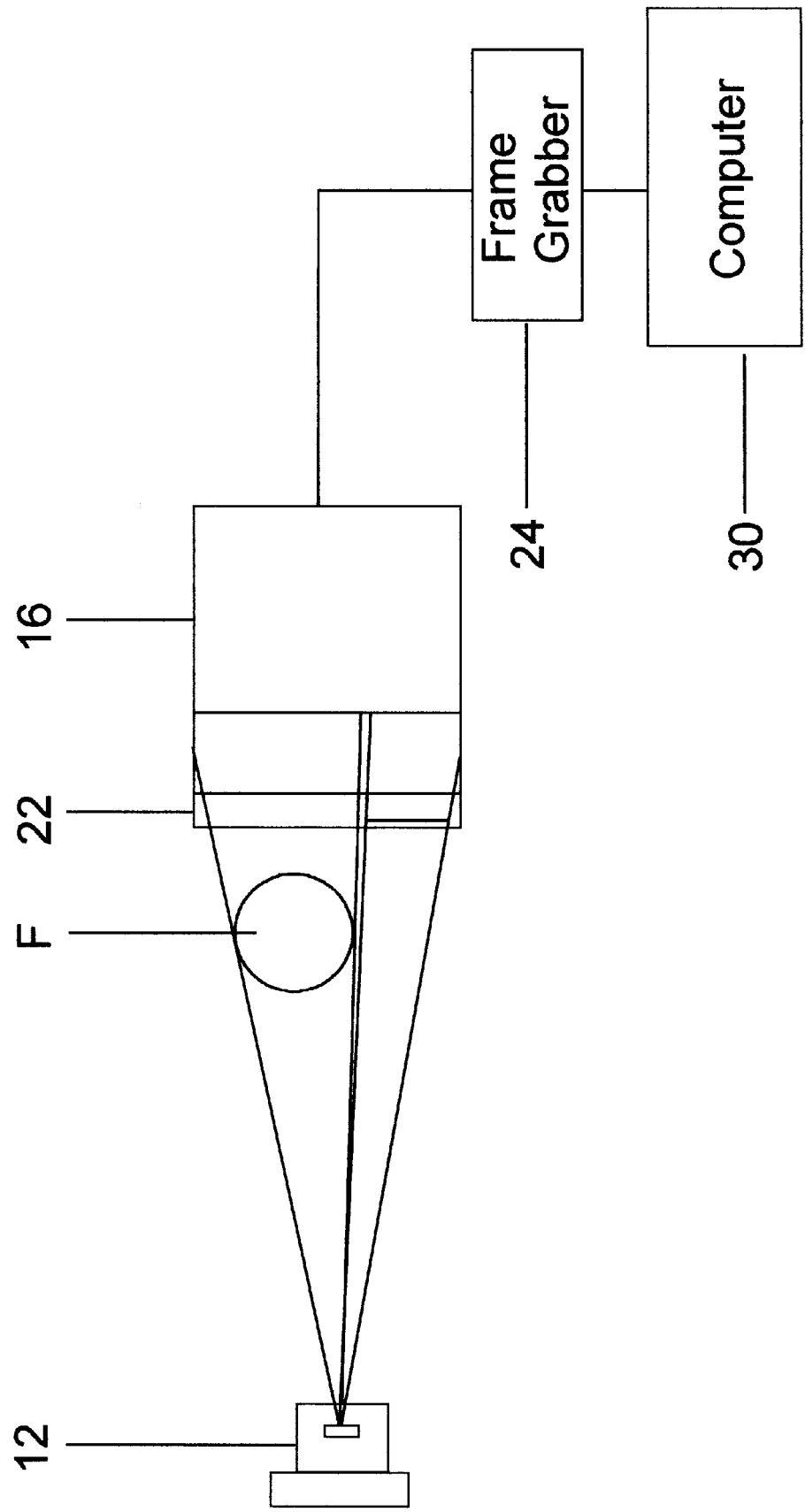
FIG. 2 is a schematic flow diagram illustrating the projection of the silhouette image superimposed on a pixel matrix of the detector array and including scales for determining computational parameters based on non-focused point source of laser light.

FIG. 2 is a schematic diagram illustrating the projection of the silhouette image superimposed on a pixel matrix of the detector array and including scales for determining computational parameters based on the new principle of a non-focused point source of laser light, showing the method of obtaining exact measurements of diameters using the laser point source of light radiation and etched scales on the faceplate of the CCD camera, 16 which enables the computation of distances between silhouette enhanced edges. With the article abutting the faceplate of the detector array 22, or against a coherent fiber optic coupler of known length, where relatively large articles are to be gauged, the known silhouette accurately represents the article and the CCD readout enables subsequent data processing of the scanned CCD matrix readout in a frame of pixels 256×256 by a frame grabber 24 for analysis by data processor 30. It should be noted that the system of FIG. 2 can be implemented in a very small package having a CCD array no larger than is required for the size of the article to be gauged, and the invention can be adapted for placement on particular machines using a data processor computer 30 of very small size. Automatic vacuum or forced air systems may be used to abut the article against the camera for testing, and then removed for storage.

Figure 3:
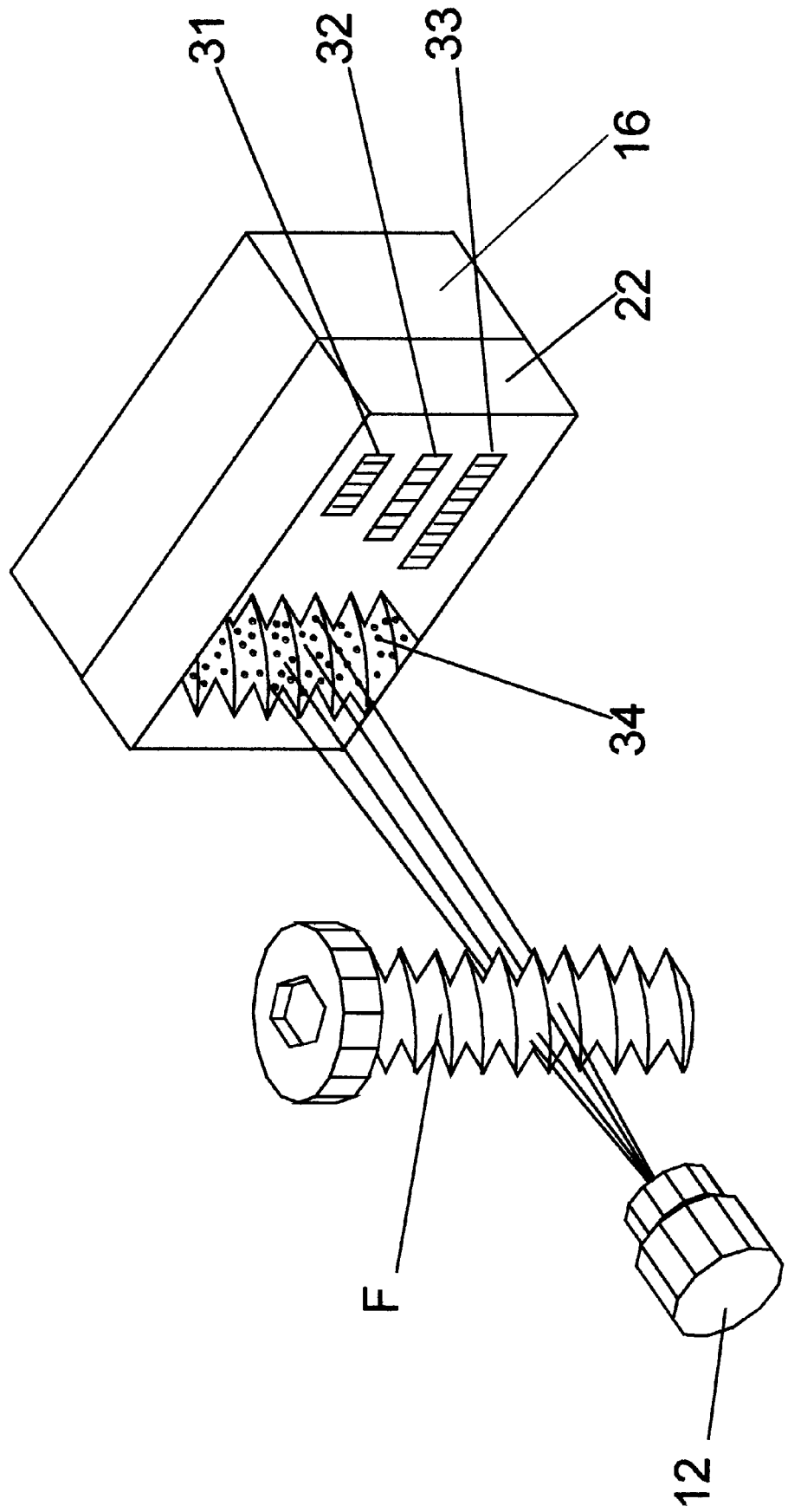
FIG. 3 is an isometric view of the test setup for a very small CCD array chip implementation of the invention showing detail of the point source of light and the array camera face plate having the precision marker scales etched thereon.

FIG. 3 is an isometric view of the test setup showing detail of the point source of light and the camera face plate having the precision marker scales etched thereon. These scales overlie the CCDs in the camera matrix and when scanned, enable the computer to obtain baseline reference data for measurement of parameters of the silhouette image. FIG. 3 shows the silhouette image 34, superimposed on a pixel matrix of the CCD camera or detector array 16. As shown in FIG. 3 the silhouette has dimensions corresponding to the size of the real object, namely an article F such as a bolt. The dimensionally precise silhouette 34 of the article F is subdivided by the illuminated or occluded individual pixels of the detector array making it possible for the frame grabber and data processor to perform complex algorithms to determine the quality of the article F.

Figure 4:
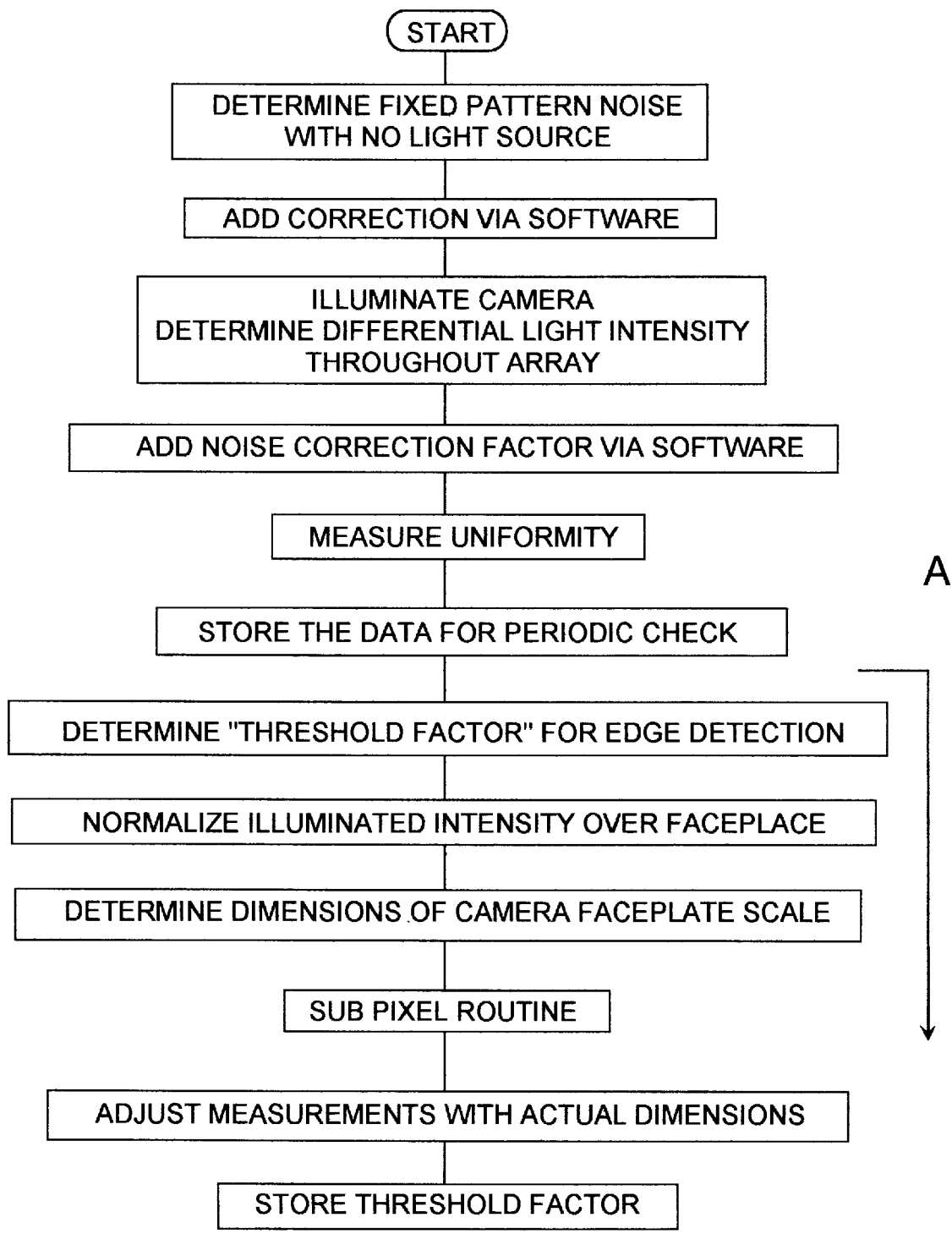
FIGS. 4 and 4a are computer flow diagram illustrating the processing from subtracting out uneven responses of the system and normalizing the light over the faceplate prior to making measurements of the silhouette, to producing a frame of imaging data to be analyzed by the process steps A and B to make the pass or reject decision for each article analyzed in real time at high rate.
Figure 4A:
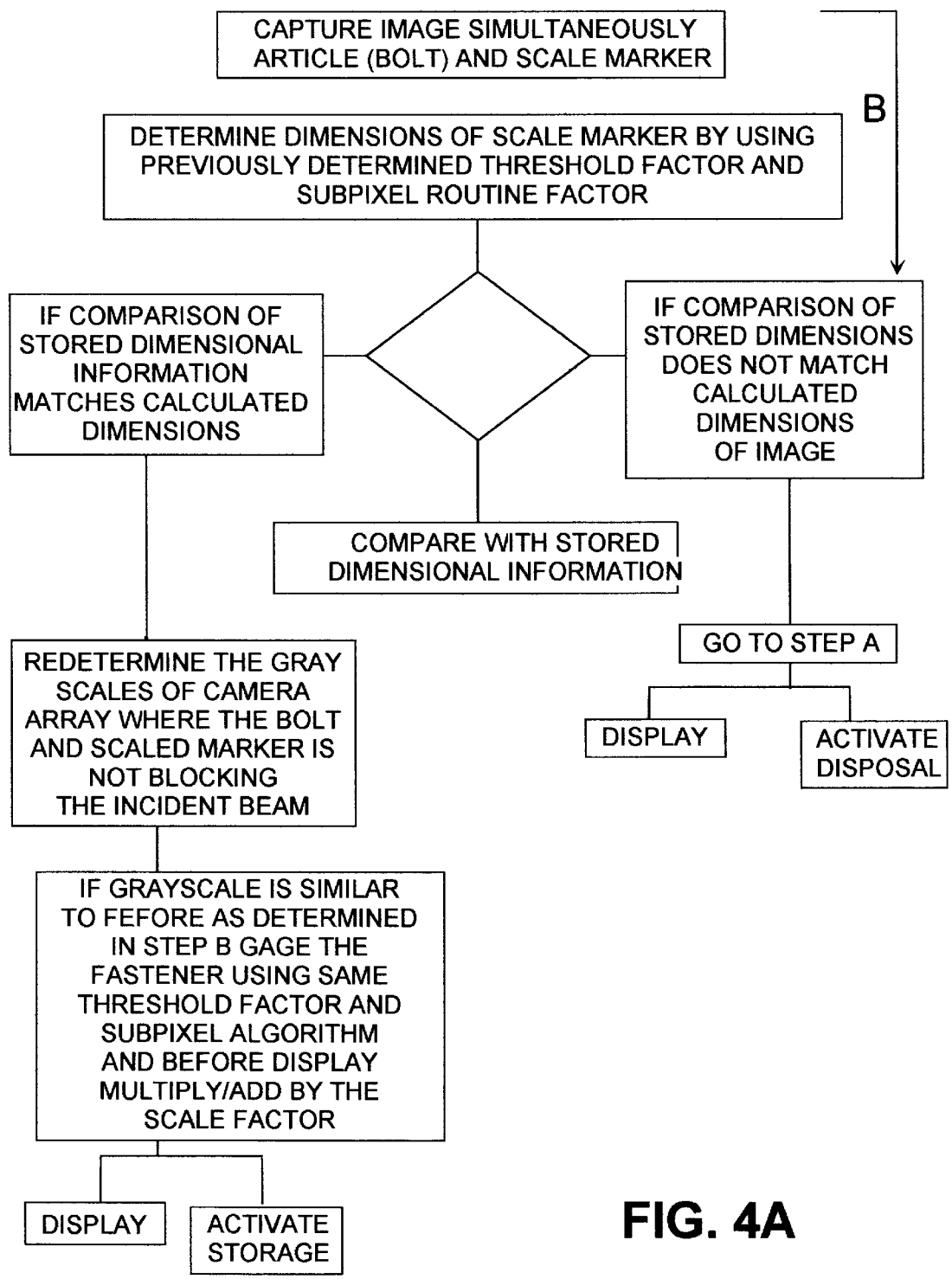

With reference to the data processor computer programming, FIG. 4, the data processing in general includes the following:

With the laser light source turned off, the background noise level is obtained and stored in computer memory, and the noise pattern on a pixel basis which will remain the same is corrected; i.e., compensated to obtain a flat response over pixel matrix.

The laser light source is then turned on to illuminate the camera and determine the differential light intensity throughout the detector array. The light intensity output per pixel should also be flat over the matrix. If correction is required, this is done by adding correction factors on a pixel basis, where needed, to obtain a uniform illumination over the matrix. Normalization data is stored for illumination calibration checks:

NORMALIZED ILLUMINATION=SPOT ILLUMIN./ MAX. ILLUMIN.

Then, the dimensions of the camera faceplate scale is noted by detecting the number of pixels occluded by the scale, and comparing this number as a percentage of the known matrix line of pixels. This determines the "threshold factor" for silhouette edge detection. If there is a difference, it should be compensated by a correction factor in the computer program, based upon a "sub-pixel routine" which is a digital representation of all pixels in the matrix, describing an article or fastener that has correct dimensions, used as a standard for comparison.

The edge of the silhouette is determined by sampling the pixels in the dark region where the shadow is cast to obtain an average of grey scale values. The unshaded pixels are subsequently or possibly concurrently sampled to obtain an average of their grey scale values. The average grey scale value of the shaded region is subtracted from the average grey scale of the unshaded region and the result multiplied by 0.25 (25%). The processor 30 searches for all pixels having the calculated number, for these represent the edge of the fastener. It is important to avoid saturating the pixels with laser illumination. With this tecnhique, an edge can be determined to better than $\frac{1}{1000}$ of an inch, and even greater to $\frac{1}{100,000}$ of an inch when subpixel interpolation is employed and by employing a two dimensional array with smaller individual pixel dimensions.

The pixels are each classified as light or dark based on the luminance level detected at the respective pixel. This can be accomplished by analog or digital threshold comparison techniques. Image processing routines and/or using the theory of diffraction for edge detection and incorporating it into the subroutines as known in the art, can be applied to the pixel data to enhance the contrast of the edge and/or to better define the nominal edge, to eliminate isolated contrasting pixels and otherwise to enhance the image data.

The processor 30 also measures the silhouette image for critical dimensional features. For example, the major and minor diameter of the fastener is calculated by counting the number of occluded pixels along horizontal lines through the image, at any or all of the thread positions. The count of occluded pixels is multiplied by the known pitch or distance between the centers of the pixels, which of course are regularly spaced. All such calculations are accomplished by the programming of the processor, preferably measuring not only major and minor diameter, but also thread pitch, pitch diameter, flank angle, longitudinal length of thread engagement and other criteria. The measurements can be compared to stored selection criteria such as nominal measurements and tolerances for acceptable parts. A deflection apparatus can be arranged downstream of the measurement system, and coupled to the processor to divert selected or rejected parts, or to sort parts based on the selection criteria and measurements.

The processor 30 controls the array of camera 16 for collecting one or more images of the fastener when in the field of view. The camera 16 preferably is electronically shuttered so that it records the silhouette when the fastener is located in the beam and occluding the detector array. An additional photodetector can be provided to produce a triggering signal when the fastener is at a predetermined position and breaks a beam. According to a preferred embodiment, a CIDTEC camera operating in synchronous capture mode is employed. This CID camera makes possible precise image capture of moving objects without the use of a strobe light.

The image processor 30 can rapidly locate edges in the pixel image data and the pixel pitch or center spacing allows measurements to be taken to an accuracy of better than one thousandth of an inch, thereby allowing accurate selection based on criteria such as thread profile and other fastener dimensions. Many of the pixel capture and data analysis functions can be performed with the frame grabber/image processor boards available from stock inventory. Operations on the data by those boards, such as measurement and analysis of the dimensions as compared to nominal dimensions, and control and timing functions, are performed with a standard computer workstation or laptop computer with sufficient processing speed, such as a computer having an InTel 486 processor or the like.

The fastener inspection system as shown and described can dependably determine dimensions of fasteners such as bolts, screws and the like, compare the measurements to selection criteria, and operate selection/rejection actuators., all at production speeds. These dimensions used to select or reject can include pitch diameter, flank angle, major diameter, thread height, thread pitch shank diameter, length of thread engagement, fastener perpendicularity and the like. It will be appreciated that other dimensions may also be pertinent with respect to fasteners or articles of a different character.

While the preferred embodiments of the present invention have been described hereinabove, it is intended that all matter contained in the above description and shown in the accompanying drawings be interpreted as illustrative and not in a limiting sense and that all modification, constructions, and arrangements that fall within the scope and spirit of the invention be considered as having been made.

What is claimed is:

1. A method of obtaining a silhouette for analysis by comparison with computer stored values, which comprises:

projecting a silhouette image of an article to be gauged on a CCD detector array matrix including a faceplate having scales for determining computational parameters from a non-focused point source of laser light and having a pixel CCD readout of the detector matrix;

determining the edges of the silhouette by sampling the pixels in the dark region where a shadow is cast to obtain an average of grey scale values;

sampling unshaded pixels to obtain an average of their grey scale values;

applying Image Processing routines and/or using the theory of diffraction for edge detection and incorporating it into the subroutines as known in the art, applied to the pixel data to enhance the contrast of the edge and/or better define the nominal edge, to eliminate isolated contrasting pixels and to enhance the image data;

averaging the edge pixel to obtain a grey scale value;

subtracting the average grey scale of the unshaded region from the grey scale value of the shaded region and multiplying by 25 percent;

computing distances between silhouette edges with the article substantially in contact with the faceplate of the detector array;

whereby the projected silhouette accurately represents the article, and the CCD readout enables subsequent data processing of the CCD matrix readout by a frame grabber for pixel analysis by a data processor.

2. The method of obtaining a silhouette for analysis by computer stored values as described in claim 1, further comprising the step of:

inserting a coherent fiber optic coupler of known length and equidistant fiber spacing, between the article and the detector where articles larger than the CCD matrix are to be gauged;

searching for all pixels having the calculated number which represents the edge of the fastener avoiding saturating the pixels with laser illumination;

classifying the pixels as light or dark based on the luminance level detected at the respective pixel by analog or digital threshold comparison.

3. The method of obtaining a silhouette for analysis by computer stored values as described in claim 1, further comprising the step of comparing the edge enhancement values against stored values for rapid accept or reject decisions.

4. A non-contacting laser gauge for dimensional measurement of small articles, which comprises:

a camera having a field of view and having a CCD matrix readout, and a camera face plate in the field of view having marker scales etched thereon that overlie the CCDs in said camera matrix;

a point source of light projecting radiation toward said camera;

means for holding an article to be gauged, in the field of view of said camera for casting a silhouette having dimensions corresponding to the size of the article;

computer means scanning said matrix and receiving data from said camera matrix readout;

whereby when the matrix of said camera is scanned, it enables the computer means to obtain baseline reference data for measurement of parameters of the silhouette image pixel matrix of the CCD camera or detector array.

5. A non-contacting laser gauge for dimensional measurement of small articles, as described in claim 4 wherein said point source of light projecting radiation toward said camera, is a diode laser.

6. A non-contacting laser gauge for dimensional measurement of small articles as described in claim 4 wherein the dimensionally precise silhouette of the article to be gauged is subdivided by the illuminated or occluded individual pixels of the detector array enabling a frame grabber and data processor to perform complex algorithms to determine the quality of the article.

7. A non-contacting laser gauge for dimensional measurement of small articles, as described in claim 4 wherein the point source of light and the camera face plate having the precision marker scales etched thereon overlie the CCDs in the camera matrix and when scanned, the illuminated or occluded individual pixels of the detector matrix enable a frame grabber and data processor to determine the angle of the light rays from the point source to any point on the silhouette edge, and knowing the distance of the light source to the article and the article to the matrix, compute the triangular baseline distances to edge points on the silhouette enabling the computer to obtain baseline reference data for measurement of lengths from points on the silhouette image, corresponding to features to be gauged.

8. A non-contacting laser gauge for qualifying screw fasteners and the like as described in claim 4 wherein the camera is a chip having nominally the size of the fastener type to be gauged receiving uncollimated light from a laser diode light source forming a silhouette on a sapphire window having equidistant etched marks thereon for scaling, and the fastener is held in contact with said sapphire window, thereby effecting accurate silhouette images for subsequent data processing.

9. A non-contacting laser gauge for qualifying screw fasteners and the like which comprises:

a housing 11 of a preferably cast material such as aluminum, enclosing components of the gauge including a point light source, an article holder, a coherent fiber optic bundle 20 and a CCD camera;

a second housing 14 mounted at one end of the housing 11 such that the beam axis of the light emerging from the light source housing 14 is aligned normal to the surface of the coherent fiber optic bundle 20;

a video camera having a large pupil and the width of the light beam as emitted from the laser source 12 is larger than the size of the pupil of the camera and the rays received by said video camera array 22 from the light source 12 are aligned by the coherent fiber optic bundle 20 and camera 16 to be parallel to one another and to the optical axis, over a height and width that is larger than the height and width of the article to be gauged, or that part of the article to be imaged and measured;

a planar solid state video sensor array 22 disposed behind the fastener F and forming a silhouette of the article F is formed on the array 22 through the fiberoptic bundle due to the incident radiation, forming a focusing lens in front of the sensor array 22 of the camera 16 and the unidirected light beam and camera 16 are oriented such that the axis and center of each lie along a line defined by the light propagation axis from the source 12, and the camera 16 detector array 22 is oriented normal to the propagation axis; such that Articles are positioned in the path of the uncollimated directional light beam, and the camera array 22;

an image processor 30 and display monitor 32 coupled to camera 16, such that the luminance information for each pixel in detector array 22 is provided to the image processor 30 and the image processor 30 includes means for addressing the pixel elements in the detector array 22;

an analog to digital converter and associated timing means;

whereby the light source 12 outputs a directional beam 24 which propagates toward the camera 16 and impinges on the detector array 22 essentially at normal incidence, and said image processor is triggered to commence an image measurement cycle whenever an article arrives in the field of view, and to collect a series of silhouette images of the passing article, for gaging, while being turned by rotating system 26 when used.

10. A non-contacting laser gauge for qualifying screw fasteners and the like as described in claim 9, wherein the article F is suspended from a vertically disposed gravity-feed-tube positioning system with its axis within a few degrees of vertical, and the article F is positioned so that it lies entirely within the uncollimated beam, and in contact with said fiberoptic bundle surface thereby casting its full silhouette on the detector array 22, and the article F occludes part of the uncollimated laser beam from source 12, thus producing a dimensionally precise silhouette of the article on the detector array 22.

* * * * *